United States Patent [19]

Takahashi et al.

[11] Patent Number: 4,581,518
[45] Date of Patent: Apr. 8, 1986

[54] WELDING APPARATUS WITH MONITOR MEANS

[75] Inventors: Yohichi Takahashi; Hiroyuki Takahashi; Yasuaki Sugie, all of Hitachi; Junichiro Morisawa, Ibaraki, all of Japan

[73] Assignee: Hitachi, Ltd., Tokyo, Japan

[21] Appl. No.: 493,261

[22] Filed: May 10, 1983

[30] Foreign Application Priority Data

May 12, 1982 [JP] Japan ................................ 57-78382

[51] Int. Cl.$^4$ ............................................... B23K 9/10
[52] U.S. Cl. ............................ 219/130.01; 219/60 A; 219/75; 219/136
[58] Field of Search .................. 219/124.34, 130.01, 219/60 R, 60 A, 136, 74, 75; 358/100, 901; 350/96.1

[56] References Cited

U.S. PATENT DOCUMENTS

| 4,277,168 | 7/1981 | Oku | 356/138 |
| 4,399,346 | 8/1983 | Kearny | 219/124.34 |
| 4,410,787 | 10/1983 | Kremers et al. | 219/124.34 |

FOREIGN PATENT DOCUMENTS 0064603 11/1982 European Pat. Off. ........ 219/124.34

Primary Examiner—Clifford C. Shaw
Attorney, Agent, or Firm—Beall Law Offices

[57] ABSTRACT

A welding apparatus with monitor means including a welding torch having an electrode located in the vicinity of its forward end and supported at its rearward portion by a welding head for rotational movement about its longitudinal axis and back-and-forth reciprocatory movement along the longitudinal axis. The welding torch further includes an electric conductor covered at its outer periphery with an insulator and formed with a gas sump in the vicinity of the electrode. The electric conductor has defined therein a gas supply passageway for supplying gas shield gas, a bore for allowing an image guide and a light guide to extend therethrough, and a bore for allowing a fluid to flow therethrough to cool the electric conductor. The image guide and light guide have their forward ends located in the gas sump, so that they can command a view of outside through guide openings serving concurrently as gas ejecting ports for ejecting the shield gas therethrough. A filter is located at the other end of the image guide, and an industrial television camera and a television receiver are mounted for converting optical images formed on the filter to television pictures to enable monitoring of welding operations to be effected.

25 Claims, 5 Drawing Figures

WELDING APPARATUS WITH MONITOR MEANS

BACKGROUND OF THE INVENTION

This invention relates to welding apparatus provided with a monitor, and more particularly it is concerned with a welding apparatus suitable for performing welding in narrow spaces.

Heretofore, in order to perform welding operations by remote control or effect their automation, it has been the usual practice to utilize fiberscopes or television cameras mounted in a position in a space remote from the welding torch to carry out welding while checking on the weld produced. In this welding system, it is necessary to provide a space for mounting a fiberscope or a television camera in addition to a space for accommodating the welding torch. Thus this welding system has suffered the disadvantage that when welding is to be carried out in narrow spaces not large enough to obtain space for mounting the monitor, it would become impossible to carry out monitoring, thereby raising the problem that the reliability of the welding operation performed might be reduced.

SUMMARY OF THE INVENTION

This invention has as its object the provision of a welding apparatus capable of monitoring the position of the welding torch and the condition in which welding is performed even in a narrow space, to thereby enable welding to be performed with increased precision and allow the reliability and quality of the weld produced to be improved.

To accomplish the aforesaid object, the invention provides an outstanding characteristic that a fiberscope serving as an image guide is built in an electric conductor of a welding torch of the welding apparatus.

In order to check on the welding position or the condition of the arc, the forward end of the fiberscope is advantageously located in a position in which an arc is generated or near the electrode. However, if the position of the fiberscope is too near the arc generating position, there would be the danger that the fiberscope might be damaged by the heat of the arc or the fumes and vapor of metals which are produced when welding is performed. To avoid this problem, the forward end of the fiberscope is cooled with gas, and at the same time the fumes and vapor of metals are removed by the gas in the welding apparatus according to the invention. This arrangement enables the forward end of the fiberscope to be located in close proximity to the electrode or in a position only 10 mm away from the electrode, with the temperature of the fiberscope only rising to about 100° C.

DESCRIPTION OF THE PREFERRED EMBODIMENT

Figure 1:
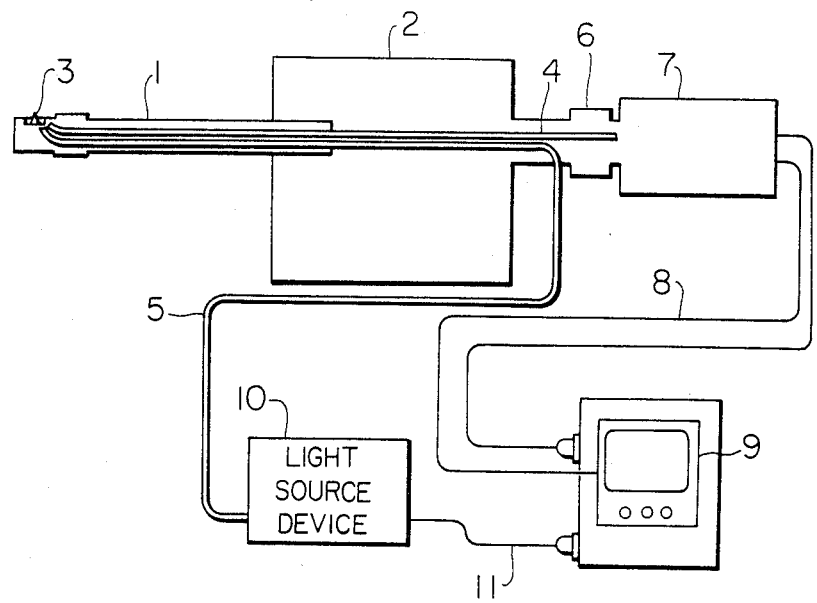
FIG. 1 is a view of the welding apparatus provided with a monitor according to the invention, showing the apparatus in its entirety.

FIG. 1 shows one embodiment of the welding apparatus provided with a monitor in conformity with the invention. As shown, a welding torch 1 is supported by a welding head 2 serving as a drive source for actuating the welding torch 1 for performing welding. The welding torch 1 is usually required to move back and forth in reciprocatory movement along its longitudinal axis and in rotary movement thereabout. The welding torch 1 has mounted at its forward end an electrode 3 to which a pulse current is passed from a power source, not shown. The welding torch 1 has mounted therein an image guide 4 and a light guide 5 which are in the form of known fiberscopes. The image guide 4 has a filter 6 located at its rear end, so that a subject in front of the image guide 4 has its image formed on the filter 6. An industrial television camera 7 is mounted to process the image formed on the filter 6 and connected through a cable 8 to a television receiver 9 on an operational panel, so the image of the subject in front of the image guide 4 can be seen as a television image on the television receiver 9. The operation panel mounts thereon a switch of an optical light source device 10 which is turned on and off through an input cable 11. When the light source device 10 is turned on, light is transmitted to the light guide 5 through which it is transmitted to the welding head 2 and illuminates a weld being formed in the vicinity of the electrode 3 at the forward end of the welding torch 1. The input cable 12 is an input cable for a welding power source.

Monitoring is carried out by using the welding apparatus of the aforesaid construction as follows. When it is desired to check on the position of the welding torch 1 before performing welding, the light source device 10 is turned on to illuminate portions of metals to be welded by means of the light guide 5 and at the same time to form an image of the portions to be welded by means of the image guide 4. This enables television pictures of the portions to be welded to be watched on the operation panel, to enable information on the position of the electrode 3 relative to the portions to be welded to be obtained. This makes it possible to achieve correct positioning of the welding torch 1, thereby contributing to improved reliability of welding and production of sound welds of high quality.

During a welding operation, a welding arc is generated and provides illumination. Thus it is possible to watch the welding operation being performed as television pictures on the television receiver 9 through the image guide 4 irrespective of whether or not the light source device 10 is turned on. After the welding operation is completed, the weld formed can be checked on in the same manner as described by referring to the monitoring of the position of the welding torch 1 prior to the welding operation.

Figure 2:
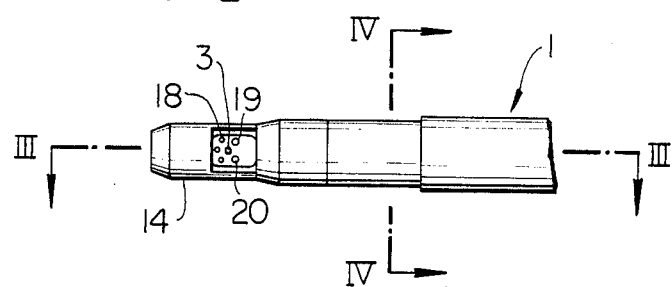
FIGS. 2-4 are views showing the forward end portion of the welding torch in detail, FIG. 2 being a plan view, FIG. 3 being a sectional view taken along the line III—III in FIG. 2 and FIG. 4 being a sectional view taken along the line IV—IV in FIG. 2.
Figure 3:
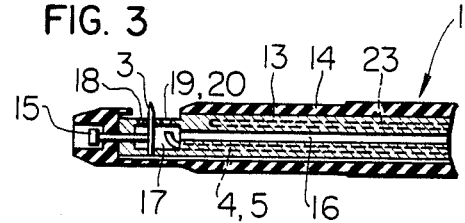
Figure 4:
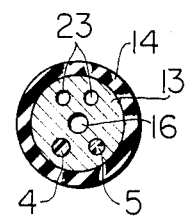

The welding torch 1 will be described in detail by referring to FIGS. 2-4. A principal member of the welding torch 1 is an electric conductor 13 which is generally in the form of a bar of copper. The electric conductor 13 is covered in its entirety with an insulating cap 14 which is only opened in the vicinity of the electrode 3. The insulating cap 14 is usually formed of ceramic material. The electrode 3 is secured to the electric conductor 13, which is formed with a bore 16 for feeding gas therethrough to a gas chamber 17 enclosing the electrode 3 fixed by a screw 15. The gas chamber 17 serves as a header for supplying gas to a plurality of gas ejecting ports 18 located about the electrode 3. When welding is carried out, shield gas, such as argon gas, is jetted out of the gas ejecting ports 18 and directed against the portions to be welded. The shield gas jetted out of the ports 18 may be 3–7 l/min as is usually the case with ordinary welding. The electric conductor 13 has two fiberscope mounted therein to serve as the image guide 4 and the light guide 5, with forward ends of the fiberscopes being positioned in the gas chamber 17. An image guide opening 19 and a light guide opening 20 are located around the electrode 3 so that the portions to be welded can be placed within the field of view of the image guide 4 and the light guide 5 through the openings 19 and 20. The openings 19 and 20 concurrently serve as gas ejecting ports. Thus as the shield gas is jetted out during welding operation, the image guide and the light guide 5 can be cooled satisfactorily with the gas. The shield gas also has the effect or removing fumes and vapor of metals generated during welding, thereby avoiding a reduction in resolving power which might otherwise be caused by the fumes and vapor of metals adhering to the image guide 4 or light guide 5.

In one example in which the invention was carried into practice, fiberscopes of 3 mm in diameter are used for the image guide 4 and the light guide 5. It has been found that a sufficiently large field of view can be secured when the guide openings 19 and 20 have the same diameter, and that cooperating with the gas ejecting ports 18 of 1.5 mm in diameter, the guide opening 19 and 20 are able to supply shield gas to the portions to be welded in an amount high enough to avoid oxidation of the weld. The welding torch 1 has defined therein a cooling water channel 23 through which cooling water is passed at a rate of 3–5 l/min from a cooling water supply source, not shown, in the welding head 2, to avoid a rise in temperature.

In the example of the aforesaid construction, transfer of heat generated by welding to the image guide 4 and the light guide 5 is avoided as follows: the heat that might be transferred by the conduction of heat is eliminated by the cooling water flowing through the welding torch 1 for the electric conductor 13; the heat of convection is eliminated by the shield gas ejected through the guide openings 19 and 20; and the heat of radiation is minimized by reducing the size of the openings 19 and 20 as much as possible. By this arrangement, a rise in the surface temperature of the fiberscopes 4 and 5 to a level above about 100° C. can be avoided even if the fiberscopes 4 and 5 are located in close proximity to the arc or only spaced apart therefrom by about 10 mm.

Figure 5:
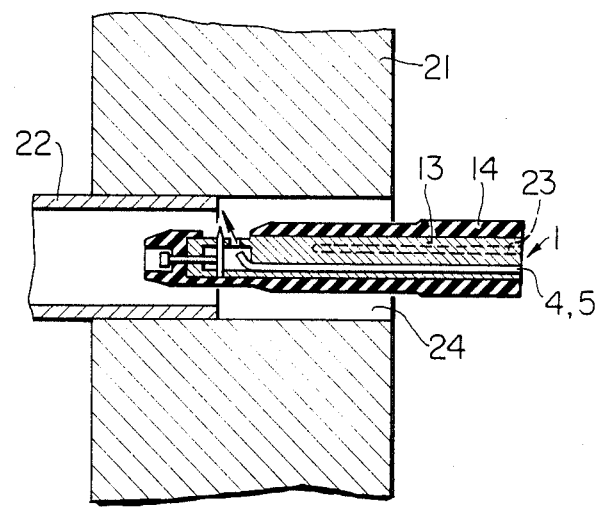
FIG. 5 is a detailed view showing the welding torch shown in FIGS. 1-4 being used for welding a heat transfer tube to tube plates to produce a heat exchanger.

FIG. 5 shows the manner in which the welding apparatus according to the invention is used for producing a heat exchanger. As shown, the welding torch 1 is used for welding a heat transfer tube 22 to tube plates 21. In one example, the specifications of the heat exchanger included: thickness of the tube plate 21, 200 mm; outer and inner diameters of the heat transfer tube 22, 22.7 mm and 20.3 mm respectively; and inner diameter of a bore 24 of the tube plate 21, 23 mm. This means that the welding apparatus according to the invention is capable of carrying out welding in a small bore of about 20 mm in diameter.

In the embodiment shown and described hereinabove, the electrode 3 is located at one side of the axially extending electric conductor 13 (see FIG. 1). It is to be understood, however, that the invention is not limited to this specific position of the electrode and that the electrode may be located in the front or at the forward end of the electric conductor to enable illumination of the portions to be welded and check up of the weld being formed to be achieved by means of the fiberscopes through the guide openings serving concurrently as gas ejecting ports.

From the foregoing description, it will be appreciated that in the welding apparatus according to the invention the provision of fiberscopes in the electric conductor of a welding torch facilitates welding performed in narrow spaces which only admit the forward portion of the welding torch, thereby enabling a sound weld of high reliability to be produced.

What is claimed is:

1. A welding torch in an electric welding apparatus with a gas shielded fiberscope monitor, comprising:
    (a) electrode means for welding a portion of a workpiece;
    (b) electric conductor means connected to said electrode means for transmitting electric energy thereto sufficient for welding;
    (c) insulation member means covering said electric conductor means for electrically insulating said electric conductor means;
    (d) gas passageway means mounted at least inside an outer periphery of said insulation member means for passing weld shield gas around said electrode means for shielding the welding; and
    (e) means for monitoring the welding, including first fiberscope means placed at least inside the outer periphery of said insulation member means for transmitting an image around the portion welded by said electrode means to a location remote from the portion welded.

2. The welding torch according to claim 1, wherein said gas passageway means is placed on substantially a center portion of said electric conductor means.

3. The welding torch according to claim 2, further comprising a cooling fluid channel means placed in said electric conductor means so that said electric conductor means conducts heat to said cooling fluid channel means.

4. The welding torch according to claim 1, wherein said first fiberscope means is mounted in said electric conductor means.

5. The welding torch according to claim 1, said monitoring means further comprising:
    second fiberscope means placed at least inside an outer periphery of said insulation member means for transmitting light to illuminate at least a portion to be welded.

6. The welding torch according to claim 5, wherein said second fiberscope means is placed in said electric conductor means.

7. The welding torch according to claim 1, further comprising gas chamber means connected to said gas passageway means and having a plurality of openings to eject gas, wherein one end of said first fiberscope means is led in said gas chamber means so as to catch the image through one of the openings.

8. The welding torch according to claim 7, said monitoring means further comprising second fiberscope means placed inside the outer periphery of said insulation member means for transmitting light from a light source to the portion to be welded and one end of said second fiberscope means is led in said gas chamber means so as to illuminate through one of the openings.

9. The welding torch according to claim 7, wherein said electrode means is located in the center of the gas chamber means and the plurality of openings are located around said electrode means.

10. The welding torch according to claim 7, wherein said first and second fiberscope means are about 3 mm in diameter.

11. The welding torch according to claim 7, wherein the diameter of the openings is the same as that of said first fiberscope means.

12. The welding torch according to claim 7, wherein one end of said first fiberscope means is spaced apart from said electrode means by about 10 mm.

13. The welding torch according to claim 7, wherein said electrode means and the openings are located on the side wall of the welding torch.

14. The welding torch according to claim 7, further comprising a cooling fluid channel means placed in said electric conductor means for cooling same.

15. The welding torch according to claim 14, wherein said cooling fluid channel means has a closed end for fluid at the nearest portion to said gas chamber means.

16. The welding torch according to claim 7, wherein the end of said first fiberscope means is spaced from the one opening so as to eject gas and to catch the image through the same opening.

17. The welding torch according to claim 7, wherein the end of said first fiberscope means is spaced from the one opening so that heat of convection to said first fiberscope means is prevented by the gas which is ejected through the same opening and heat transfer to said first fiberscope means by radiation is reduced by said gas chamber means around the same opening.

18. The welding torch according to claim 1, further comprising cooling fluid channel means placed in said electric conductor means for cooling same.

19. An electric welding apparatus with a gas shielded fiberscope monitor, comprising:
 (a) welding torch means including;
  (i) electrode means for welding;
  (ii) electric conductor means connected to said electrode means for transmitting electric energy;
  (iii) insulation member means covering said electric conductor means for electrically insulating said electric conductor;
  (iv) gas passageway means mounted on the inside of an outer periphery of said insulation member means for passing gas for shielding against welding; and
  (v) first fiberscope means placed at least inside the outer periphery of said insulation member means for transmitting an image around a portion welded by said electrode means;
 (b) welding head means for supporting said welding torch means for actuating said welding torch means;
 (c) filter means located posterior to said first fiberscope means for forming images transmitted through said first fiberscope means thereon;
 (d) television camera means for converting images formed on said filter means to electric signals; and
 (e) television receiver means for converting the electric signals to television pictures.

20. The electric welding apparatus with a gas shielded fiberscope monitor according to claim 19, further comprising second fiberscope means placed inside an outer periphery of said insulation member means for transmitting light from a light source to around a portion to be welded.

21. The electric welding apparatus with a gas shielded fiberscope monitor according to claim 20, wherein said second fiberscope means is placed in said electric conductor means.

22. The electric welding apparatus with a gas shielded fiberscope monitor according to claim 21, further comprising cooling fluid channel means placed in said electric conductor means for cooling same.

23. The electric welding apparatus with a gas shielded fiberscope monitor according to claim 20, further comprising gas chamber means connected to said gas passageway means and having a plurality of openings to eject gas, wherein one end of said first fiberscope means is led in said gas chamber means so as to catch the image through one of the openings and one end of said second fiberscope means is led in said gas chamber means so as to illuminate through another of said openings.

24. The electric welding apparatus with a gas shielded fiberscope monitor according to claim 19, wherein said welding head means moves said welding torch means back and forth in reciprocatory movement and in rotary movement.

25. The electric welding apparatus with gas shielded fiberscope monitor according to claim 19, wherein said insulation member means includes ceramic material enough to protect said first fiberscope means from heat caused during welding.

* * * * *